United States Patent
Taguchi

(10) Patent No.: US 10,760,588 B2
(45) Date of Patent: Sep. 1, 2020

(54) CENTRIFUGAL COMPRESSOR

(71) Applicant: HONDA MOTOR CO., LTD., Tokyo (JP)

(72) Inventor: Shu Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 16/355,979

(22) Filed: Mar. 18, 2019

(65) Prior Publication Data
US 2020/0040908 A1 Feb. 6, 2020

(30) Foreign Application Priority Data

Mar. 20, 2018 (JP) ................................ 2018-052425

(51) Int. Cl.
*F04D 17/10* (2006.01)
*F04D 29/44* (2006.01)

(52) U.S. Cl.
CPC ........... *F04D 29/444* (2013.01); *F04D 17/10* (2013.01)

(58) Field of Classification Search
CPC ...... F04D 17/10; F04D 29/444; F04D 29/685; F02C 3/08
See application file for complete search history.

(56) References Cited

U.S. PATENT DOCUMENTS

| | | | | |
|---|---|---|---|---|
| 4,131,389 A * | 12/1978 | Perrone | ................. | F04D 29/444 415/208.3 |
| 6,200,094 B1 * | 3/2001 | Skoch | ................... | F04D 29/444 415/208.2 |
| 7,326,027 B1 * | 2/2008 | Skoch | ................. | F04D 27/0207 415/150 |
| 8,235,648 B2 * | 8/2012 | LeBlanc | ............... | F04D 29/444 415/58.4 |
| 9,394,916 B2 * | 7/2016 | Small | ..................... | F04D 29/444 |
| 2006/0198727 A1 * | 9/2006 | Arnold | ...................... | F02C 6/12 415/169.1 |
| 2014/0241906 A1 * | 8/2014 | Jan | ...................... | F04D 27/0292 417/53 |
| 2015/0226232 A1 * | 8/2015 | Duong | ................... | F04D 29/684 415/1 |
| 2017/0211586 A1 * | 7/2017 | Gage | ................... | F04D 29/4206 |
| 2018/0172022 A1 * | 6/2018 | Duong | .................. | F04D 29/684 |

FOREIGN PATENT DOCUMENTS

| | | |
|---|---|---|
| JP | H10-37899 | 2/1998 |
| JP | 2001-304186 | 10/2001 |
| JP | 2001-342995 | 12/2001 |

* cited by examiner

*Primary Examiner* — Igor Kershteyn
(74) *Attorney, Agent, or Firm* — Rankin, Hill & Clark LLP

(57) ABSTRACT

In a centrifugal compressor including an impeller (70) having rotor blades (74), a shroud (72) surrounding the impeller, and a diffuser (76) having stator vanes (78), the shroud (72) includes a plurality of openings (80) opening toward the impeller (70) in a part thereof adjacent to an impeller outlet portion (42B), and a communication passage (82) communicating the openings (80) with one another, the openings including first openings (80A) that are arranged at a same interval as the stator vanes, and second openings (80B) arranged intermediately between the adjacent first openings.

5 Claims, 4 Drawing Sheets

CENTRIFUGAL COMPRESSOR

TECHNICAL FIELD

The present invention relates to a centrifugal compressor suitable for use in a gas turbine engine for aircraft.

BACKGROUND ART

A centrifugal compressor employed in a gas turbine or the like typically includes an impeller including a plurality of rotor blades arranged circumferentially at a prescribed interval, a shroud provided so as to oppose the impeller to define an annular impeller inlet portion opening in an axial direction and an annular outlet portion opening radially outward in cooperation with the impeller, a diffuser having an annular diffuser inlet portion opposing the impeller outlet portion, and a row of stator vanes arranged circumferentially in the diffuser inlet portion at a prescribed interval. See JP2001-304186A and JP2001-342995, for instance. Such a centrifugal compressor may be referred to as closed impeller centrifugal compressor.

In a known diffuser for a centrifugal compressor provided with a row of stator vanes, a plurality of openings are provided in an inlet part of the diffuser so as to correspond to the stator vanes, and these openings are communicated with a common annular passage. See JPH10-37899A.

In an impeller outlet portion of a centrifugal compressor, a high pressure zone is created in a front face part of each rotor blade, and a low pressure zone is created in a rear face part of each rotor blade. The working fluid such as air flowing from the impeller outlet portion to the diffuser inlet portion preserves this pressure distribution into the diffuser inlet portion.

As the working fluid is forwarded by the impeller from the impeller outlet portion to the diffuser inlet portion, a certain pressure distribution is created along the leading edges of the stator vanes. The rotor blades of the impeller pass the stator vanes of the diffuser as the impeller rotates, and this causes a periodic disturbance in the pressure distribution in the impeller outlet portion. The resulting periodic change in the pressure distribution in the impeller outlet portion causes vibration of the impeller blades. Such a vibration is undesirable for the durability of the impeller blades, and may even cause a destructive contact between the impeller blades and the shroud surrounding the impeller in extreme cases.

The prior art disclosed in JPH10-37899A is intended as a solution to the problem of the pressure fluctuation in the impeller outlet portion and the diffuser inlet portion in the hope of equalizing the pressure in the circumferential direction via the small openings and the annular passage provided in the diffuser inlet portion. However, since the pressure distribution is cyclic along the circumferential direction, an effective equalization of pressure cannot be expected if the small openings are provided at the same pitch as the impeller blades. Therefore, this prior art is not likely to be effective in preventing the vibration of the impeller blades, and increasing the durability of the impeller blades.

SUMMARY OF THE INVENTION

In view of such a problem of the prior art, a primary object of the present invention is to provide a centrifugal compressor that allows the pressure fluctuations at the impeller outlet portion and the diffuser inlet portion thereof to be reduced, and the durability of the rotor blades to be improved.

To achieve such an object, the present invention provides a centrifugal compressor, comprising: an impeller (70) including a plurality of rotor blades (74) arranged at a prescribed interval; a shroud (72) provided so as to oppose the impeller (70) to define an annular impeller inlet portion (42A) opening in an axial direction and an annular impeller outlet portion (42B) opening in a radially outward direction in cooperation with the impeller (70); a diffuser (76) disposed radially outward of the impeller (70) and having an annular diffuser inlet portion (76A) which opens radially inward and opposes the impeller outlet portion (42B); and a plurality of stator vanes (78) provided in the diffuser inlet portion (76A) at a prescribed interval in a circumferential direction, wherein the shroud (72) includes a plurality of openings (80) opening toward the impeller (70) in a part thereof adjacent to the impeller outlet portion (42B), and a communication passage (82) communicating the openings (80) with one another, the openings including first openings (80A) that are arranged at a same interval as the stator vanes, and second openings (80B) arranged intermediately between the adjacent first openings.

Because of the angular phase difference between the first openings and the second openings, there is a greater chance for the pressure variations in the impeller outlet portion to be equalized so that the vibration of the rotor blades can be favorably controlled, and damage to the rotor blades and the shroud can be avoided.

In this centrifugal compressor, preferably, the first openings and the second openings are arranged along a circle concentric to the impeller.

Thereby, the pressure distribution along the circumference of the impeller can be effectively equalized.

In this centrifugal compressor, preferably, the second openings (80B) are each positioned between a ¼ point and a ¾ point in the interval between the corresponding adjoining pair of the first openings (80A).

By positioning the second openings in this manner, the equalization of pressure in the impeller outlet portion along the circumference thereof can be accomplished in a favorable manner.

In this centrifugal compressor, preferably, the second openings (80B) are each positioned at a substantially midpoint in the interval between the corresponding adjoining pair of the first openings (80A).

By positioning the second openings in this manner, the equalization of pressure in the impeller outlet portion along the circumference thereof can be accomplished in a most favorable manner.

In this centrifugal compressor, preferably, the communication passage (82) comprises an annular passage concentric to the impeller, and communicates all of the openings (80A, 80B) to one another.

Thereby, all of the openings (80A, 80B) can be communicated with one another by using a highly simple structure.

According to the centrifugal compressor of the present invention, pressure fluctuation in a circumferential direction in an impeller outlet portion can be reduced so that the vibrations of rotor blades can be reduced, and the durability of the rotor blades can be improved.

DESCRIPTION OF THE PREFERRED EMBODIMENT(S)

A preferred embodiment of the present invention is described in the following with reference to the appended drawings.

Figure 1:
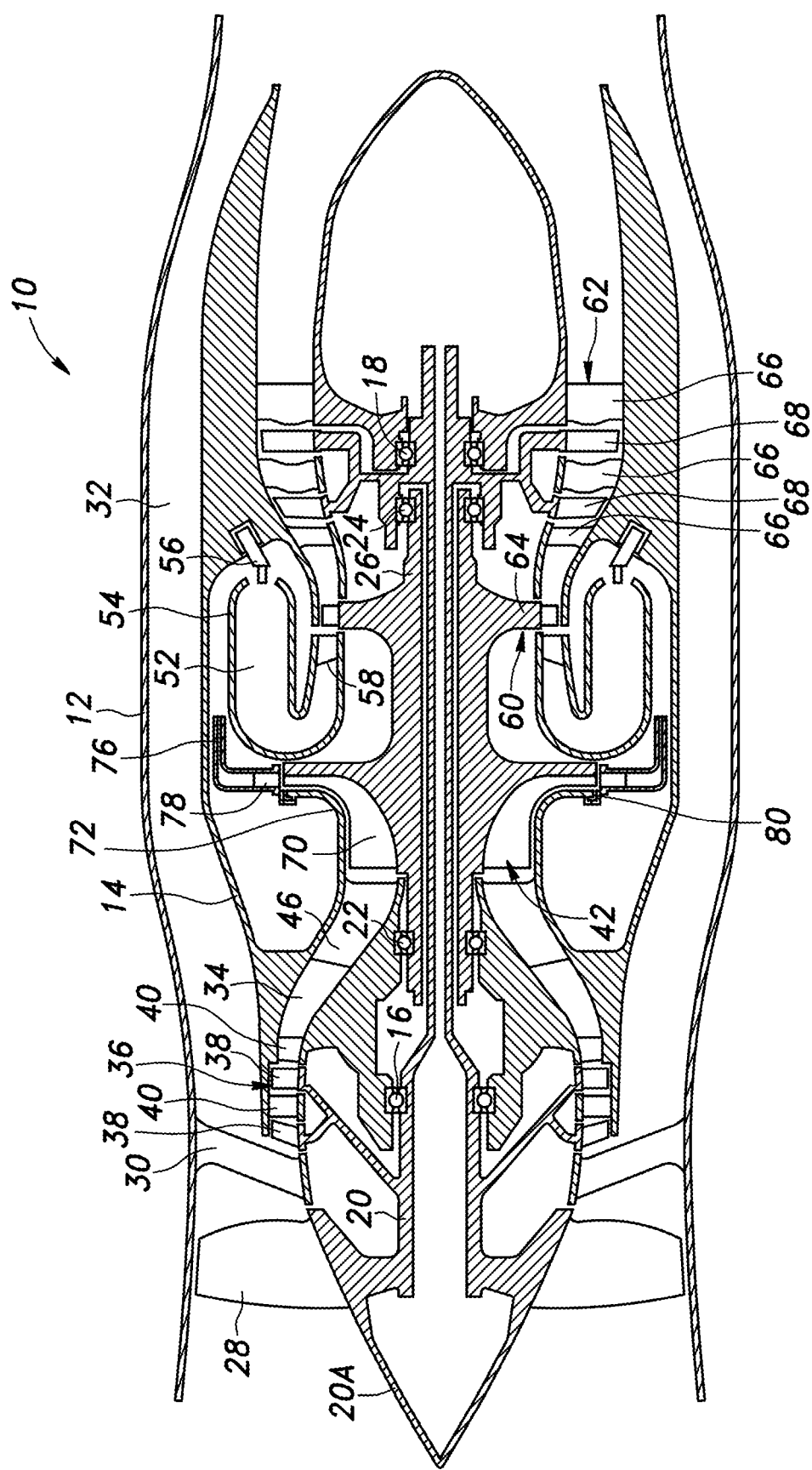
FIG. 1 is a sectional view showing an outline of a gas turbine engine for aircraft employing a centrifugal compressor according to an embodiment of the present invention.

FIG. 1 shows an outline of a gas turbine engine (turbofan engine) for aircraft using a centrifugal compressor according to an embodiment of the present invention.

The gas turbine engine 10 is provided with an outer casing 12 and an inner casing 14 which are substantially cylindrical in shape, and are coaxially arranged relative to each other. The inner casing 14 rotatably supports a low pressure rotating shaft 20 via a front first bearing 16 and a rear first bearing 18 fitted on the outer periphery of the low pressure rotating shaft 20. The inner casing 14 also rotatably supports a high pressure rotating shaft 26 consisting of a hollow shaft coaxially receiving the low pressure rotating shaft 20 therein via a front second bearing 22 and a rear second bearing 24 fitted on the outer periphery of the high pressure rotating shaft 26.

The low pressure rotating shaft 20 includes a substantially conical front end portion 20A projecting axially forward from the inner casing 14, and surrounded by a front end part of the outer casing 12. A front fan 28 is provided on the outer periphery of the front end portion 20A. A plurality of stator vanes 30 each having an outer end joined to the outer casing 12 and an inner end joined to the inner casing 14 are provided on the downstream side of the front fan 28 at a regular interval in the circumferential direction. On the downstream side of the stator vane 30, a bypass duct 32 having an annular cross sectional shape is defined between the outer casing 12 and the inner casing 14, and an air compression duct (annular fluid passage) 34 having an annular cross sectional shape is defined inside the inner casing 14 in a coaxial relationship (concentric with the central axial line).

An axial compressor 36 is provided in an inlet part of the air compression duct 34. The axial compressor 36 is provided with two rows of rotor blades 38 extending radially outward from the front end portion 20A of the low pressure rotating shaft 20, and two rows of stator vanes 40 extending radially inward from the inner casing 14 in such a manner that the rows of the stator vanes 40 and the rows of the rotor blades 38 are arranged axially in close proximity and in an alternating manner.

An outlet part of the air compression duct 34 is provided with a plurality of stator vanes 46, and a centrifugal compressor 42 is provided immediately downstream of the stator vanes 46.

A plurality of reverse-flow combustors 52 are formed on the downstream side of the diffuser 50 to receive compressed air from the diffuser 50. The inner casing 14 is provided with a plurality of fuel injectors 56 for injecting fuel into the reverse-flow combustors 52. The reverse-flow combustors 52 generate high pressure combustion gas by the combustion of the mixture of the fuel and the air. A row of nozzle guide vanes 58 are provided downstream of the reverse-flow combustors 52.

Downstream to the nozzle guide vanes 58 are provided a high pressure turbine 60 and a low pressure turbine 62 in that order. The combustion gas generated by the reverse-flow combustors 52 is forwarded to the high pressure turbine 60 and the low pressure turbine 62. The high pressure turbine 60 includes a high pressure turbine wheel 64 fixed to the outer periphery of the high pressure rotating shaft 26 immediately downstream of the nozzle guide vanes 58. The low pressure turbine 62 includes a plurality of rows of nozzle guide vanes 66 fixedly attached to the inner casing 14 and a plurality of low pressure turbine wheels 68 fixedly attached to the outer periphery of the low pressure rotating shaft 20 so as to alternate with the rows of the nozzle guide vanes 66.

The gas turbine engine 10 is provided with a starter motor (not shown in the drawings) for starting the engine by rotatively driving the high pressure rotating shaft 26. When the high pressure rotating shaft 26 is rotatively driven, the intake air is compressed by the centrifugal compressor 42, and is forwarded to the reverse-flow combustors 52. The fuel injected from the fuel injectors 56 is mixed with the compressed intake air, and combusted in the reverse-flow combustors 52. The produced combustion gas is forwarded to the high pressure turbine wheel 64 and the low pressure turbine wheels 68 to rotatively drive the high pressure and low pressure turbine wheels 64 and 68.

As a result, the low pressure rotating shaft 20 and the high pressure rotating shaft 26 are rotatively driven so as to cause the front fan 19 to be rotated, and the axial compressor 36 and the centrifugal compressor 42 to be operated so that the compressed air is supplied to the reverse-flow combustors 52. Once this cycle is established, the gas turbine engine 10 continues operation even after the starter motor is stopped.

During the operation of the gas turbine engine 10, a part of the air drawn by the front fan 28 passes through the bypass duct 32 and is ejected rearward to create a thrust primarily during low speed flight. The remaining part of the air drawn by the front fan 28 is supplied to the reverse-flow combustors 52, and mixed with the fuel to combust the fuel. The resulting combustion gas rotatively drives the low pressure rotating shaft 20 and the high pressure rotating shaft 26, and is ejected rearward to create a thrust.

Figure 2:
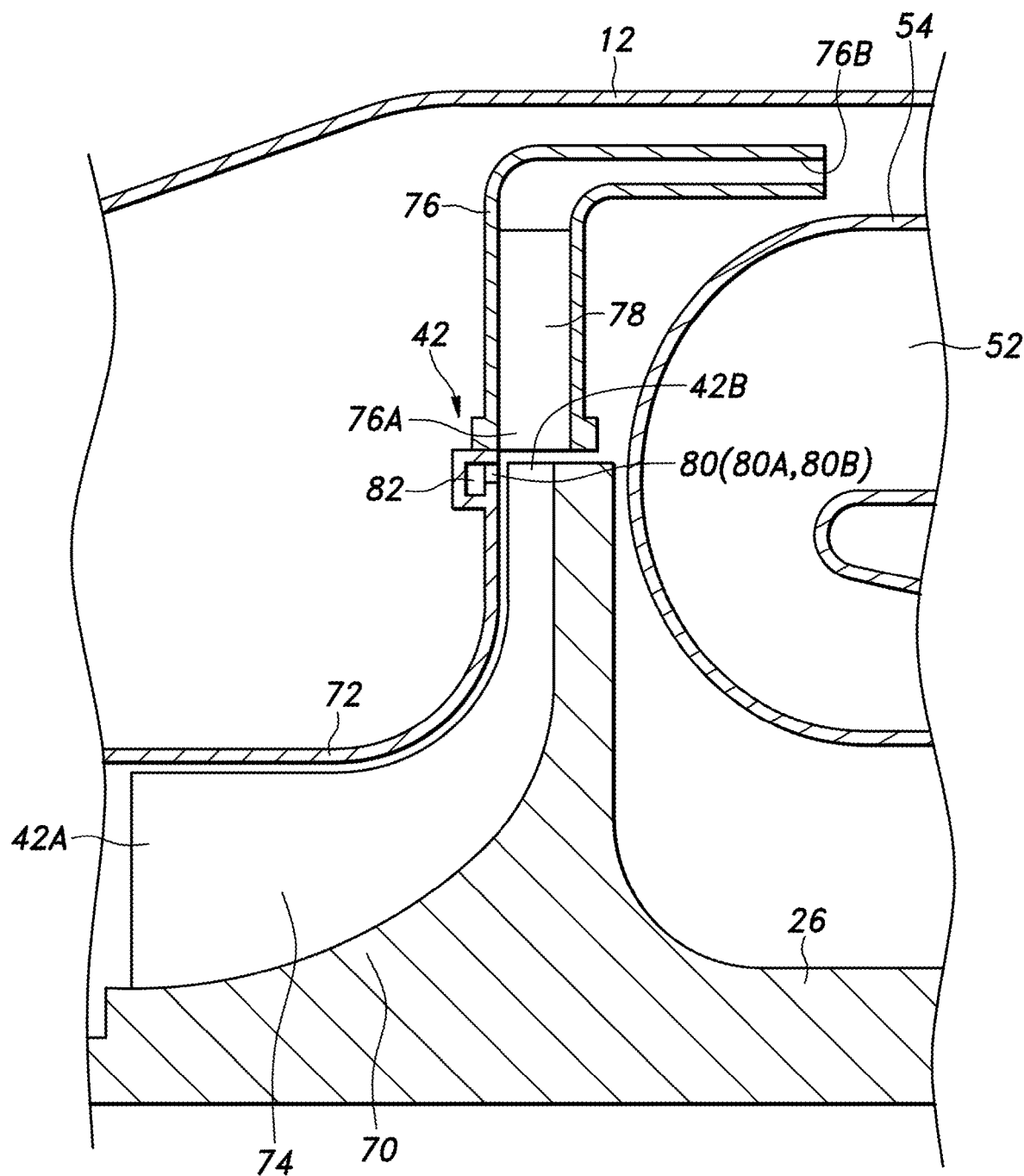
FIG. 2 is a fragmentary cross sectional view of the centrifugal compressor.
Figure 3:
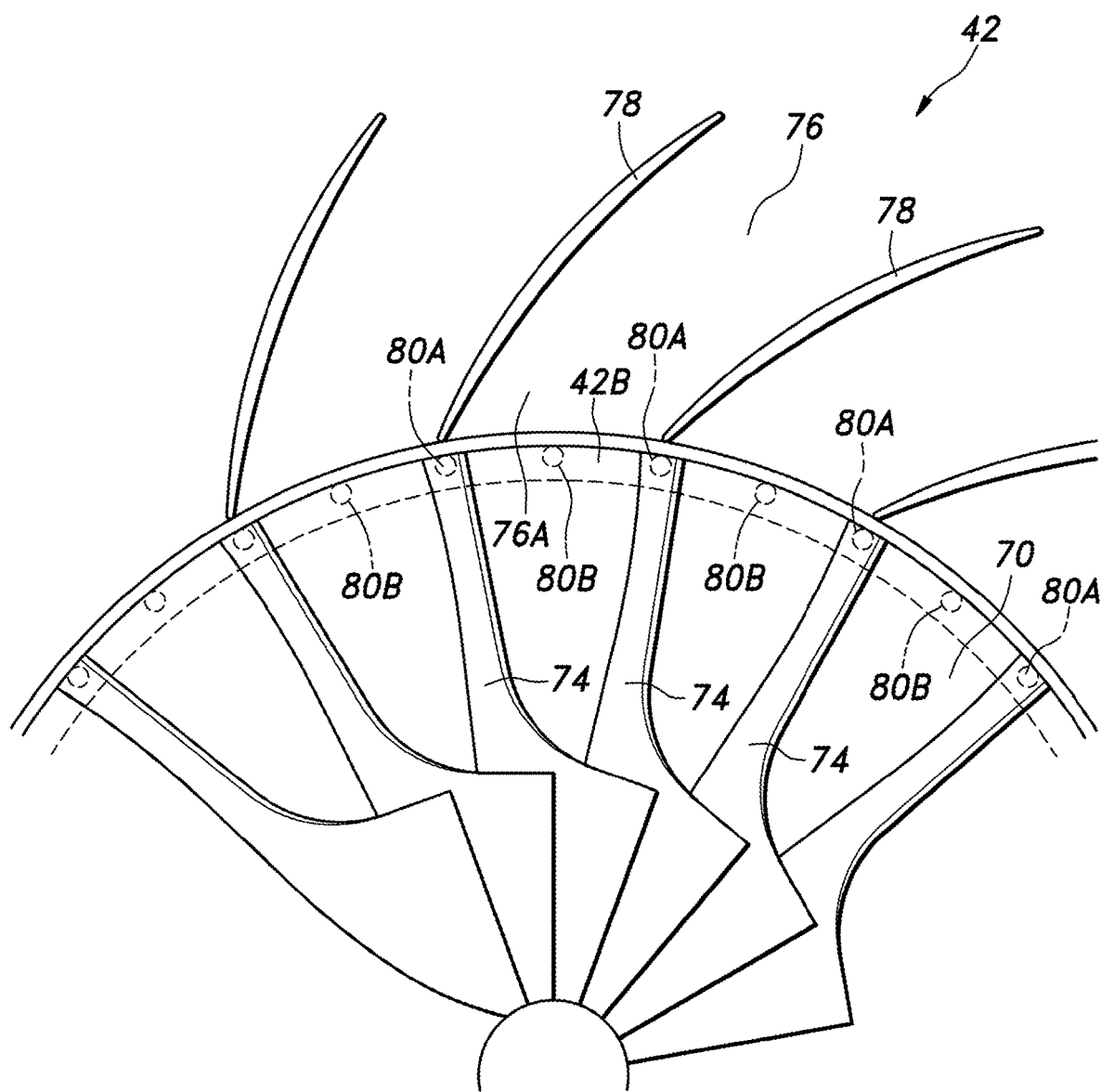
FIG. 3 is a fragmentary front view of the centrifugal compressor.

The details of the centrifugal compressor 42 will be described in the following with reference to FIGS. 2 and 3.

The centrifugal compressor 42 includes an impeller 70 of an open impeller design fixedly fitted on the high pressure rotating shaft 26, and a shroud 72 constituted by a part of the inner casing 14. The impeller 70 includes a plurality of rotor blades 74 provided at a prescribed interval around the central axial line of the high pressure rotating shaft 26. The shroud 72 is provided on the front side of the impeller 70, or in other words, opposed to the rotor blades 74, and cooperates with the impeller 70 to form an annular impeller inlet portion 42A which opens in an axially forward direction and an annular impeller outlet portion 42B opening in a radially outward direction.

A diffuser 76 is fixedly arranged radially outwardly of the impeller 70. The diffuser 76 has an annular diffuser inlet portion 76A that opens in a radially inward direction to oppose the impeller outlet portion 42B, and a diffuser outlet portion 76B that opens in an axially rearward direction. A plurality of stator vanes 78 are provided in the diffuser inlet portion 76A at a prescribed interval in the circumferential direction. The pitch of the stator vanes 78 may be the same as the pitch of the rotor blades 74.

The shroud 72 is provided with a plurality of openings (holes) 80 opening toward the impeller 70 in the impeller outlet portion 42B. As shown in FIG. 3, the openings 80 includes first openings 80A arranged circumferentially at the same pitch as the stator vanes 78 and second openings 80B arranged between the mutually adjoining first openings 80A, each between an adjoining pair of the first openings 80A. In other words, the first openings 80A and the second openings 80B are same in number, and alternate one another in the circumferential direction at a regular interval.

The first openings 80A and the second openings 80B are located on a circle concentric to the impeller 70. The first openings 80A are positioned so as to align with the leading edges of the corresponding stator vanes 78 along the circumferential direction. The second openings 80B are provided each at a midpoint between the adjacent first openings 80A. Therefore, the openings 80 including the first openings 80A and the second openings 80B are arranged circumferentially at a half the pitch of the stator vanes 78.

The shroud 72 is provided with a communication passage 82 formed by an annular passage concentric to the impeller 70. The communication passage 82 communicates all of the openings 80 inclusive of the first openings 80A and the second openings 80B with one another.

Figure 4A:
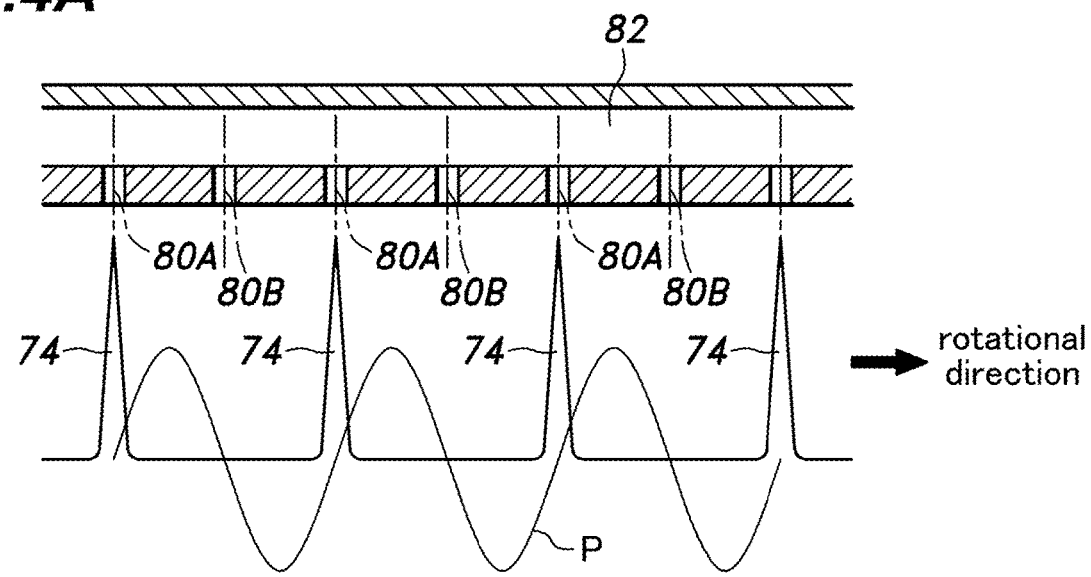
FIG. 4A is a diagram showing the distribution of pressure in an inlet part of a diffuser when an impeller is at a first angular position.
Figure 4B:
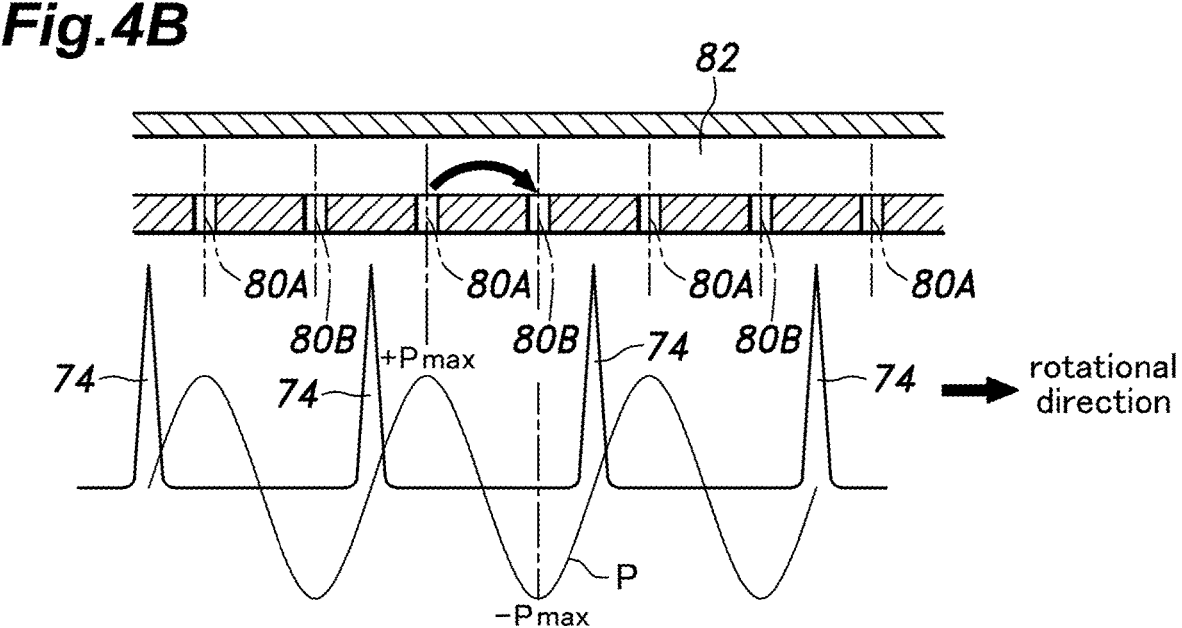
FIG. 4B is a diagram showing the distribution of pressure in the inlet part of the diffuser when the impeller is at a second angular position.

As shown in FIGS. 4A and 4B, the pressure distribution of the working fluid at the impeller outlet portion 42B (or the diffuser inlet portion 76A) corresponds to the arrangement of the rotor blades 74, and changes sinusoidally along the circumference of the impeller 70. In other words, the pressure changes cyclically along the circumference of the impeller 70 at the same pitch as that of the rotor blades 74.

As shown in FIG. 4A, when the angular position of the impeller 70 is such that the rotor blades 74 are aligned with the corresponding first openings 80A. The second openings 80B are offset from the first openings by a phase angle of 180 degrees. Therefore, the pressure level at each opening 80 is substantially zero so that no transmission of pressure takes place between the openings 80.

As the rotational angle of the impeller 70 advances, the pressure P of the working fluid acting on the first opening 80A rises to a positive pressure while the pressure P of the working fluid acting on the second opening 80B drops to a negative pressure. When the rotor blades 74 have advanced by an angle corresponding to a quarter (¼ or 90 degrees) of the pitch of the rotor blades 74 as shown in FIG. 4B, the pressure P of the working fluid acting on the first openings 80A takes a maximum positive value + Pmax, and the pressure P of the working fluid acting on the second openings 80B takes a minimum negative value − Pmax. Therefore, the pressure variation between the first openings 80A and the second openings 80B is maximize so that transmission of pressure takes place between the openings 80 in a most active manner. As the rotational angle of the impeller 70 advances further, the pressure P of the working fluid acting on the first opening 80A drops from the positive maximum value, and the pressure P of the working fluid acting on the second opening 80B rises from the negative minimum value. When the rotor blades 74 have advanced by an angle corresponding to a one half (½ or 180 degrees) of the pitch of the rotor blades 74, the pressure P of the working fluid acting on the first openings 80A and the second openings 80B becomes zero once again.

When the rotor blades 74 have advanced by an angle corresponding to three quarters (¾ or 270 degrees) of the pitch of the rotor blades 74, the pressure P of the working fluid acting on the first openings 80A takes a minimum negative value − Pmax, and the pressure P of the working fluid acting on the second openings 80B takes a maximum positive value + Pmax.

When the rotor blades 74 have advanced by an angle corresponding to the pitch of the rotor blades 74, the pressure level at each opening 80 becomes substantially zero once again.

As described above, the pressure P of the working fluid acting on the openings 80A and 80B changes as the impeller 70 rotates, and when a pressure difference is created between the part occupied by the first openings 80A and the part occupied by the second openings 80B, a transfer of pressure occurs between the two sets of openings (80A and 80B) so that the pressure difference between the part occupied by the first openings 80A and the part occupied by the second openings 80B is reduced, or the pressure distribution along the circumferential direction is equalized.

As a result, the pressure fluctuations in the impeller outlet portion 42B (or the diffuser inlet portion 76A) along the circumferential direction are reduced so that the vibrations of the rotor blades 74 and the stator vanes 78 can be effectively minimized.

In the illustrated embodiment, the openings 80 are arranged on a circle concentric to the impeller 70, and this arrangement is preferred because a particularly effective equalization along the circumferential direction can be achieved. However, it is also possible to stagger the first openings 80A and the second openings 80B in the radial direction of the centrifugal compressor 42 or along the direction of air flow in the impeller outlet portion 42B. For the purpose of the present invention, the openings 80 may also be formed in the diffuser inlet portion 76A, instead of the impeller outlet portion 42B.

Thus, according to the present invention, the vibrations of the rotor blades 74 and the stator vanes 78 can be minimized by using a highly simple structure.

Although the present invention has been described in terms of a preferred embodiment thereof, the present invention is not limited by such an embodiment, but can be appropriately modified without departing from the spirit of the present invention. For example, the positions of the second openings 80B are not limited to the midpoints between the adjacent first openings 80A, but may also be in the ranges each extending between a ¼ point and a ¾ point in the interval between the corresponding adjoining pair of the first openings 80A. It is also possible for the pitch of the stator vanes 78 to differ from the pitch of the rotor blades 74.

The invention claimed is:

1. A centrifugal compressor, comprising:
an impeller including a plurality of rotor blades arranged at a prescribed interval;
a shroud provided so as to oppose the impeller to define an annular impeller inlet portion opening in an axial direction and an annular impeller outlet portion opening in a radially outward direction in cooperation with the impeller;
a diffuser disposed radially outward of the impeller and having an annular diffuser inlet portion which opens radially inward and opposes the impeller outlet portion; and
a plurality of stator vanes provided in the diffuser inlet portion at a prescribed interval in a circumferential direction,
wherein the shroud includes a plurality of openings opening toward the impeller in a part thereof adjacent to the impeller outlet portion, and a communication passage communicating the openings with one another, the openings including first openings that are arranged at a same interval as the stator vanes, and second openings arranged intermediately between the adjacent first openings.

2. The centrifugal compressor according to claim 1, wherein the first openings and the second openings are arranged along a circle concentric to the impeller.

3. The centrifugal compressor according to claim 1, wherein the second openings are each positioned between a ¼ point and a ¾ point in the interval between the corresponding adjoining pair of the first openings.

4. The centrifugal compressor according to claim 3, wherein the second openings are each positioned at a substantially midpoint in the interval between the corresponding adjoining pair of the first openings.

5. The centrifugal compressor according to claim 1, wherein the communication passage comprises an annular passage concentric to the impeller, and communicates all of the openings (80A, 80B) to one another.

* * * * *